United States Patent [19]

Sakabe et al.

[11] 4,411,851

[45] Oct. 25, 1983

[54] METHOD FOR MAKING FRICTION MATERIAL WITHOUT ASBESTOS FIBERS INCLUDING REPEATED PRESSING AND DEGASSING STEPS

[75] Inventors: Toshiaki Sakabe; Yasuhiro Matsumoto; Hisami Tsujio, all of Aichi, Japan

[73] Assignees: Aisin Seiki Kabushiki Kaisha; Aisin Kako Kabushiki Kaisha, both of Kariya, Japan

[21] Appl. No.: 312,966

[22] Filed: Oct. 20, 1981

[30] Foreign Application Priority Data

Oct. 29, 1980 [JP] Japan ............................ 55-151628

[51] Int. Cl.³ .......................... B29D 3/02; B29G 1/00
[52] U.S. Cl. ................................... 264/137; 264/257
[58] Field of Search ............... 264/137, 109, 257, 120; 425/812; 192/107 M; 188/251 A

[56] References Cited

U.S. PATENT DOCUMENTS

| | | | |
|---|---|---|---|
| 2,309,571 | 1/1943 | Bruce et al. | 264/120 |
| 2,522,936 | 9/1950 | Ferguson | 264/109 |
| 3,137,038 | 6/1964 | Maynard | 425/812 |
| 3,476,848 | 11/1969 | Schroeder | 264/120 |
| 3,647,722 | 3/1972 | Albertson et al. | 192/107 M |
| 3,655,609 | 4/1972 | Evans et al. | 192/107 M |
| 3,751,330 | 8/1973 | Gilbert | 188/251 A |
| 3,967,037 | 6/1976 | Marzocchi et al. | 192/107 M |
| 4,119,591 | 10/1978 | Aldrich | 188/251 A |
| 4,173,681 | 11/1979 | Durrieu et al. | 188/251 A |
| 4,262,788 | 4/1981 | Yammamoto et al. | 192/107 M |

*Primary Examiner*—Willard E. Hoag
*Attorney, Agent, or Firm*—Oblon, Fisher, Spivak, McClelland & Maier

[57] ABSTRACT

A friction material particularly useful as a clutch facing is prepared by (a) impregnating a fiber base material with a binder, said fiber being other than asbestos fiber and being stable to heat without reduction in weight and in volume in an atmosphere at 300° C.; (b) shaping the impregnated fiber into the predetermined shape of a crude friction material; (c) inserting said shaped material into the cavity of a mold which has been heated to a predetermined temperature; (d) pressure/heat treating said shaped material by compressing the crude friction material for 2 to 10 seconds at a predetermined pressure and at a predetermined temperature in a closed mold and degassing the compressed friction material for 0.5 to 2 seconds in an open mold, and repeating the cycle of step (d) 10 to 20 times.

9 Claims, No Drawings

METHOD FOR MAKING FRICTION MATERIAL WITHOUT ASBESTOS FIBERS INCLUDING REPEATED PRESSING AND DEGASSING STEPS

BACKGROUND OF THE INVENTION

1. Field of the Invention

The present invention relates to a method of producing a friction material, particularly a clutch facing, used in vehicles such as automobiles. More particularly, the present invention is directed to a clutch facing prepared without using asbestos fibers.

2. Description of the Prior Art

In the past friction materials which have been utilized in the preparation of clutch facings have been prepared by various processes all of which use asbestos fibers as a base material. However, because asbestos fibers are believed to be harmful to human health, the production of the friction materials which contain asbestos fibers is accompanied by such concerns as the state of the working environment in which the friction materials are prepared as it relates to workers' health.

In view of this problem, active studies have recently been started in the friction material industry in order to develop a friction material which does not contain asbestos fibers. As a result, several kinds of friction materials have been proposed. One such proposed friction material is one which is based upon steel fibers as the base material. However, because steel generally has a large specific gravity, its use results in an increase in weight of the resulting friction material, and consequently the required moment of inertia is not obtainable. Friction materials based upon steel fiber have the further disadvantage that they are apt to rust and as a result stick to the mating material thereby causing failure in the function of the clutch, as well as other problems. Organic natural fibers and organic synthetic fibers generally available on the market which are free of these drawbacks have also been studied as base materials for friction materials. However, these fibers are all inferior from the viewpoint of being impervious to heat and from the viewpoint of strength, so that a good friction material, which is not based upon asbestos, has not been available.

Other fiber materials have also been proposed which have superior heat resistance such as glass fibers, phenol fibers and carbon fibers. In order to prepare friction materials from such fibers, the fibers are impregnated with binders and additives and the resulting impregnated fibers are subjected to a pressure/heat forming process. However, the surfaces of these fibers are even surfaces with no roughness so that their adhesion to the binder is insufficient and the desired strength of a friction material product is not obtained. In order to solve this problem it has been proposed to make the diameter of the fibers smaller, but this results in an increase in cost, thus making their use difficult. A need, therefore, continues to exist for a friction material based upon a fibrous material other than asbestos of improved characteristics.

SUMMARY OF THE INVENTION

Accordingly, one object of the present invention is to provide a method of producing a friction material which uses as its base material a fiber other than asbestos fibers, which friction material is not functionally inferior to conventional friction materials based upon asbestos fibers.

Another object of the present invention is to provide a method of producing a friction material having superior Judder or Shudder characteristics.

Briefly, these objects and other objects of the present invention as hereinafter will become more readily apparent can be attained in a method for producing a friction material by (a) impregnating a fiber base material with a binder, said fiber being other than asbestos fiber and being stable to heat without reduction in weight and in volume in an atmosphere at 300° C.; (b) shaping the impregnated fiber into the predetermined shape of a crude friction material; (c) inserting said shaped material into the cavity of a mold which has been heated to a predetermined temperature; (d) pressure/heat treating said shaped material by compressing the crude friction material for 2 to 10 seconds at a predetermined pressure and at a predetermined temperature in a closed mold and degassing the compressed friction material for 0.5 to 2 seconds in an open mold, and repeating the cycle of step (d) 10 to 20 times.

DETAILED DESCRIPTION OF THE PREFERRED EMBODIMENTS

In view of the problems encountered with previous fiber substitutes a friction material has now been developed which is free of the drawbacks of the abovementioned heat resistant fibers. The present invention has been achieved by applying a bulking process to glass fibers, phenol fibers and carbon fibers. However, the friction material obtained from the bulked fibers has the drawback that it possesses somewhat inferior Judder or Shudder characteristics, although it exhibits improved characteristics in comparison to conventional products and is practically useful. The Judder or Shudder phenomenon is the abnormal vibration observed while operating the clutch in the half engaged position at the time of starting of a vehicle, and this phenomenon is likely to occur when the hardness of the friction material is high and its porosity is low.

Suitable fiber base materials which are utilized to produce friction materials within the scope of the method of the present invention include fibers having a heat resistance at 300° C. such as glass fibers, phenol fibers, carbon fibers, and the like. The term "heat resistance" means that the fiber used is stable to heat without undergoing reduction in weight or volume contraction in an atmosphere at 300° C. In the present invention, it is preferable to use monofilaments of the above mentioned fibers having a diameter not larger than 12μ and, in the actual use of the fibers, it is desirable to bind several hundreds of the monofilaments in a bundle. The bundle of the monofilaments is then subjected to a strand process and then ten to several tens of the strands are roved into a string and the string is subject to a bulking process.

The texturing or bulking process as used herein means imparting to thread-like fibers such as glass fibers and chemical fibers a crimp-like form which is present in such natural fibers as wool. The crimping improves the texture of the thread-like fibers and imparts elasticity and bulkiness thereto, as has been mentioned in some literature references. A suitable bulking process may be selected according to the classification of the fibers, for example, depending on whether the fibers are elastic or non-elastic.

In the manufacture of the friction material of the present invention any known method for preparing friction materials can be used except the pressure/heat forming process. Typical of known methods is the so-called semimold method wherein a friction material is produced by impregnating the fibers with a binder, drying, rubber coating, drying, winding in the form of a loop, molding under pressure and heating, after-curing and polishing.

The kinds of compounding ingredients used in the present invention and the compounding methods are not limited to particular types. Known compounding ingredients may be selected according to the use, namely, according to the type of vehicle in which the friction material is to be used.

In a typical example of the product of the present invention from 30 to 60%, preferably 40 to 50%, by weight of one or more fibers selected from the group consisting of pre-bulked glass fibers, phenol fibers and carbon fibers are used as a base fiber material. The fiber is combined with from 10 to 20% and 5 to 15% of a phenolic resin and a rubber, respectively, and at the same time a vulcanizing agent consisting of a rubber vulcanizer, an acelerator and a vulcanization assistant in a amount nearly equal to the amount of the rubber as a binder is added to the mixture, the amounts of the ingredients being based on the entire friction material by weight. In addition, additives are employed which improve the frictional characteristics of the product, and preferably these additives are incorporated in amounts approximately corresponding to the remaining parts by weight. Suitable binders which may be utilized include thermosetting resins such as phenolic resins and melamine resins. The rubber ingredient need not be used in the case a friction material is to be produced according to the spiral-woven method which is a widely used technique. When the rubber ingredient is to be used, a synthetic rubber such as SBR or NBR is preferred. With respect to the additives, two or more additives may be used such as cashew dust, graphite, carbon black, calcium carbonate, diatomaceous earth, barium sulfate and copper powder.

The pressure/heat forming process as used in the present invention is a process in which a preformed, crude friction material is pressed and heated by first impregnating a fiber string base material with a binder, drying the impregnated string and then dipping this material into a rubber solution which has been prepared by kneading additives with rubber followed by adjusting the solution to a predetermined concentration with a suitable solvent. Thereafter, the impregnated string material is wound in the form of a loop. The shaped crude friction material is then subjected to the pressure/heat forming process of the present invention. In this process the crude friction material is inserted into the cavity of a mold which has been heated to a predetermined temperature and then the pressure/heat forming is repeated for 10 to 20 cycles, preferably 13-15 cycles. One cycle of the process constitutes the pressing of the crude friction material for 2 to 10 seconds at a predetermined pressure and temperature while the mold is closed and subsequent degassing for 0.5 to 2 seconds while the mold is open.

The pressure/heat forming process further includes an additional step to be applied after completion of the foregoing steps in which the mold is closed for several minutes for pressing and heating the crude friction material to effect complete curing of the binder. Normally, the above pressure/heat forming process is conducted at a pressure in the range of from 90 to 130 kg/cm$^2$ and at a temperature in the range of from 155° to 175° C.

Generally speaking, in the conventional presure/heat forming process unlike the present process, degassing of the impregnated base material is performed first by opening and closing the mold several times, thereafter closing the mold and molding the material under pressure and heat for several minutes to cure the binder and complete the process. If this technique is used, however, it is unavoidable that the friction material product obtained has a low porosity and a high hardness.

Having generally described this invention, a further understanding can be obtained by reference to certain specific examples which are provided herein for purposes of illustration only and are not intended to be limiting unless otherwise specified.

EXAMPLE 1

E-glass monofilaments having a diamter of 6$\mu$ were bundled, stranded and roved, and then bulked. The bulked fibers were dipped into a solution of a phenolic resin in methanol having a solids content of 15%, and then dried at 120° C. for about 10 minutes until the methanol volatilized thoroughly. Thereafter, the fibers were coated with rubber by being dipped into a coating bath which had been prepared by kneading SBR with an accelerator CZ, zinc white, carbon black, calcium carbonate, barium sulfate, diatomaceous earth and copper powder by means of a rubber roller and dissolving the rubber with toluene to adjust the viscosity to 10,000-20,000 c.p.s. At the same time, a brass wool was wound on the fibers, which were then air-dried fully and wound onto a take-up unit in the form of a loop. The crude friction material thus wound-up like a loop was placed into a mold positioned in a compression molding machine which had been adjusted to a temperature of 165° C. and a pressure of 100 kg/cm$^2$. The mold was closed for 5 seconds under pressure and heating, and immediately thereafter the mold was opened for 1 second to effect degassing. This operation of a single cycle was repeated 14 times until the pressure/heat forming process was complete. The so-formed article was subjected to a continuous heat treatment at 150° C. for 6 hours, at 200° C. for 3 hours and at 250° C. for 3 hours in a heating furnace, and then both the friction surface and back were polished to obtain a friction material.

COMPARATIVE EXAMPLE 1

In the pressure/heat forming process, a crude friction material prepared and wound-up in the form of a loop in the same way as described in Example 1 was placed in a mold positioned in a compression molding machine which had been set to a temperature of 165° C. and a pressure of 100 kg/cm$^2$. The mold was closed for 5 seconds to allow forming to proceed under pressure and heating, and immediately thereafter the mold was opened to effect degassing for 1 second. (This operation will be hereinafter referred to as "degassing"). With this operation as one cycle, the same was repeated 8 times and then the mold was closed to allow molding (hereinafter referred to as "curing") to take place for 2.5 minutes under pressure and heat. By this procedure a friction material was obtained in the same manner as described in Example 1 except for the differences described above.

COMPARATIVE EXAMPLE 2

A friction material was obtained in the same way as described in Example 1 except that the degassing was repeated 8 cycles in the pressure/heat forming process and the curing step was conducted for 1.5 minutes.

COMPARATIVE EXAMPLE 3

A friction material was obtained in the same way as described in Example 1 except that the degassing was repeated 8 cycles in the pressure/heat forming process and the curing step was conducted for 1 minute.

COMPARATIVE EXAMPLE 4

The same procedure as described in Example 1 was repeated except that the temperature and surface pressure of the mold disposed in the compression molding machine were set at 165° C. and 30 kg/cm$^2$, respectively, and that the degassing and curing were performed 8 cycles and for 2.5 minutes, respectively. However, it was impossible to shape the crude friction material into a desired contour and thus a friction material was not obtainable.

The friction materials obtained in Example 1 and Comparative Examples 1 through 4 were each measured for hardness according to the Rockwell S scale, for the Judder or Shudder characteristic by means of a detector mounted on the floor portion, and for full-size depth wear (after 200 times engagement at 200° C.) by means of an inertial dynamometer. The results are shown in Table 1 below.

TABLE 1

|  | Facing Hardness (HRS) | Judder or Shudder (G) | Depth of Wear (mm) | Porosity (%) |
| --- | --- | --- | --- | --- |
| Example 1 | 50 | 0.095 | 0.60 | 8 ~ 12 |
| Comparative Example 1 | 105 | 0.220 | 0.50 | 1 ~ 3 |
| Comparative Example 2 | 100 | 0.220 | 0.50 | 1 ~ 3 |
| Comparative Example 3 | 90 | 0.150 | 0.55 | 3 ~ 5 |
| Comparative Example 4 | —* | — | — | — |

*Measurement was not possible because no friction material product was obtained.

Reference to Table 1 clearly shows that the product obtained by the method of the present invention is a superior friction material satisfying the Judder of Shudder characteristic of not more than 0.1 G required for vehicles and it also satisfies the depth of wear of 0.7 mm. The present product is a friction material of high utility having a very high porosity.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of producing a friction material, comprising the steps of:
    (a) impregnating a fiber base material with a binder, said fiber being other than asbestos fiber and being stable to heat without reduction in weight and in volume in an atmosphere at 300° C.;
    (b) shaping the impregnated fiber into the predetermined shape of a crude friction material;
    (c) inserting said shaped material into the cavity of a mold which has been heated to a predetermined temperature;
    (d) pressure/heat treating said shaped material by compressing the shaped material for 2 to 10 seconds at a predetermined pressure and at a predetermined temperature in a closed mold and degassing the compressed shaped material for 0.5 to 2 seconds in an open mold; and
    (e) repeating the cycle of the two steps of step (d) 10 to 20 times.

2. The method of claim 1, wherein said fiber is at least one fiber selected from the group consisting of glass fibers, phenol fibers and carbon fibers.

3. The method of claim 1 or 2 wherein said fiber is subjected to bulking prior to impregnation with the binder.

4. The method of claim 1, wherein said binder comprises a phenolic resin and a rubber.

5. A method of producing a friction material, comprising the steps of:
    (a) impregnating 30% to 60% of a fiber or a blend of fibers selected from the group consisting of glass fibers, phenol fibers and carbon fibers, said fibers being stable to heat without reduction in weight and in volume in an atmosphere at 300° C., with 15% to 35% of a binder and the remaining material being an additive;
    (b) shaping the resulting impregnated fiber into the predetermined shape of a crude friction material;
    (c) inserting said shaped, crude friction material into the cavity of a mold held at a temperature of 155° to 175° C.;
    (d) pressure/heat treating said shaped material by compressing the crude friction material at a pressure of 90 to 110 kg/cm$^2$ for 2 to 10 seconds at a temperature of 155° to 175° C. in a closed mold and degassing the compressed friction material for 0.5 to 2 seconds in an open mold; and
    (e) repeating the cycle of the two steps of step (d) 10 to 20 times.

6. The method of claim 5, wherein said crude friction material contains 40% to 50% by weight of said fiber component.

7. The method of claim 5, wherein said crude friction material contains, by weight, 30–60% of said fiber component, 10–20% of a phenolic resin and 5–15% of a rubber, said phenolic resin and said rubber constituting said binder, and further containing a vulcanizer and a vulcanizing accelerator, the amount of said vulcanizer and said vulcanizing accelerator being substantially the same as the amount of said rubber.

8. The method of claim 7, wherein said fiber component ranges form 40% to 50% of said crude friction material.

9. The method of claims 5, 6, 7 or 8, wherein said crude friction material contains at least one additive selected from the group consisting of cashew dust, graphite, carbon black, calcium carbonate, diatomaceous earth, barium sulfate and copper powder.

* * * * *